Patented Nov. 4, 1952

2,616,629

UNITED STATES PATENT OFFICE 2,616,629

THERMOSTATIC MIXING VALVE

William V. Jordan, Lebanon, Ohio, assignor to Jordan Regulator Corporation, Lebanon, Ohio, a corporation of Ohio Application November 24, 1950, Serial No. 197,347

6 Claims. (Cl. 236—12)

This invention relates to mixing valves and more particularly to a mixing valve utilizing a thermally responsive element to automatically proportion the flow of fluids being mixed to maintain a substantially uniform temperature in the resultant mixture.

An object of this invention is to provide a mixing valve that can be set at a desired preselected temperature which will be maintained by the mixture regardless of wide and sudden variations in temperature and quantity of the incoming fluids.

Another object of this invention is to provide a mixing valve that is not only extremely accurate and sensitive, but is sturdy and reliable and will give dependable service though subjected to hard usage and abuse.

A further object of the invention is to provide accurate and dependable thermally actuated operating means for a mixing valve having an actuating stem normally biased in one direction.

Still another object of the invention is to provide a mixing valve characterized by its extreme sensitivity and provided with simple, yet highly effective actuating means which may be easily and inexpensively produced using modern mass production methods and which may be serviced without difficulty, and without requiring the use of special tools.

Still a further object of the invention is to provide a mixing valve which is particularly adapted for use as a shower valve. Heretofore considerable difficulty has been experienced in those instances wherein mixing valves have been utilized to control the temperature of water discharged from shower heads and other discharge orifices when the volume or temperature of the hot and cold fluids being mixed has been abruptly and/or considerably varied. The valve of the present invention is characterized by its ability to immediately respond to volume and/or temperature changes in fluids being mixed thereby overcoming the inherent disadvantages of the prior art devices with which I am familiar.

Another object of the invention is to provide an improved mixing valve which is compact, having thermal-responsive valve actuating means built into the valve housing whereby the entire flow of mixed fluids is caused to pass over the thermal responsive means, thereby greatly increasing the overall effectiveness and efficiency of the device.

Still a further object of the invention is to provide a mixing valve with novel manually operable means for enabling the user of the device to select any temperature between the temperature of the cold water supplied to the device, and a predetermined preset maximum temperature not in excess of a safe maximum temperature. This feature is of prime importance in those instances wherein the valve is used as a shower valve since it will prevent the temperature of the fluid discharged from the shower head from reaching dangerous values. My device will promptly and automatically interrupt the flow of fluid from a shower head should the cold water supply fail for any reason whatsoever, and if the temperature of the hot water delivered to the valve is in excess of the temperature setting of the valve.

These and other objects are attained by the means described herein and as disclosed in the accompanying drawings, in which.

Figure 1:
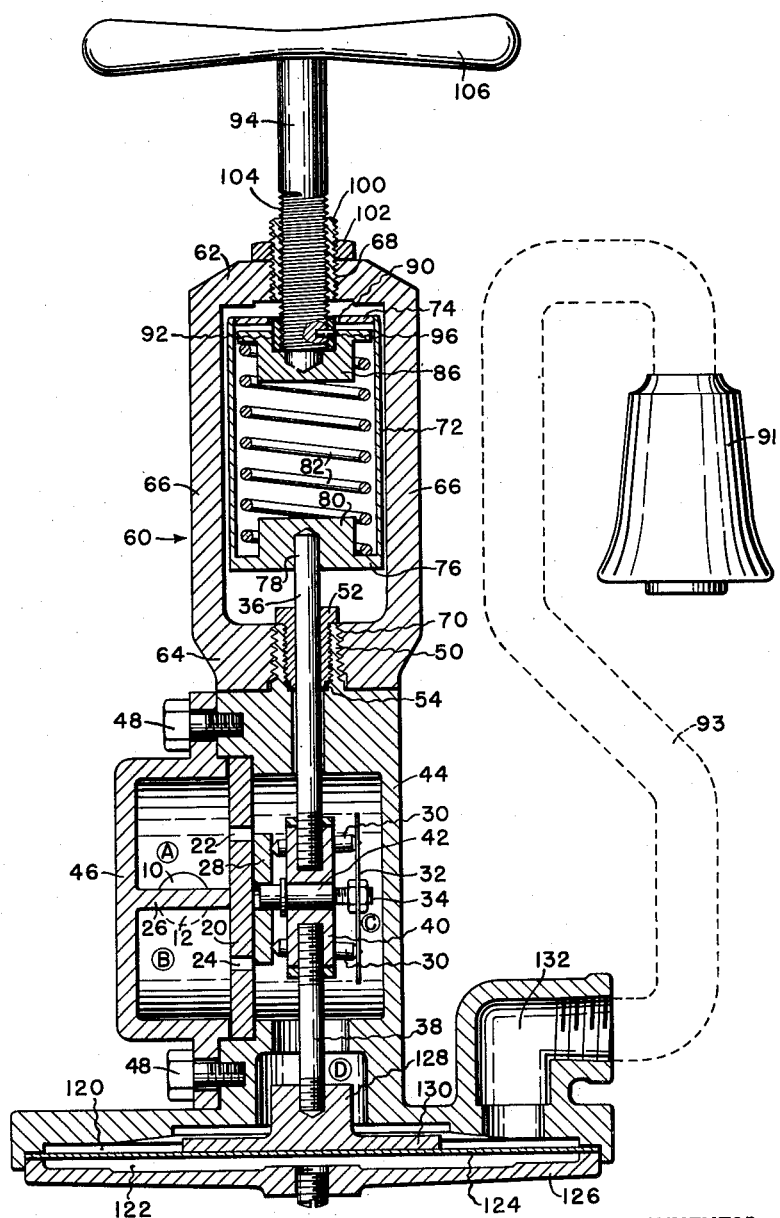
Fig. 1 is a vertical sectional view through a mixing valve embodying the teachings of the present invention.

With particular reference now to Fig. 1, it will be noted that the valve comprises a pair of inlet chambers A and B, a mixing chamber C and a discharge chamber D. Chambers A and B are each separated from chamber C by means of an orifice plate 20 provided with apertures 22 and 24. Flow of fluid from chambers A and B into the mixing chamber is controlled by means of a slide valve 28 which proportions the quantities of fluid entering the mixing chamber.

The inlet and orifice plate proportioning arrangement for actual mixing of the fluids are similar to those revealed in my presently copending patent application filed December 13, 1949, Serial No. 132,777. Port 22 is disposed in interconnecting relationship between chambers A and C, while port 24 is disposed in interconnecting relationship with chambers B and C, it being noted that chambers A and B are entirely self-contained and are separated from each other by barrier 26.

Fluids introduced into chamber A and B will be discharged through ports 22 and 24, respectively, into chamber C which is the mixing chamber.

A slide valve 28 is located in chamber C, the dimensional characteristics of the valve being such as to selectively engage ports 22 and 24 for proportionately varying their relative openings. Thus when one of the ports in the orifice plate has been completely closed, the other port therethrough will have been completely opened.

Slide valve 28 is normally and yieldably urged against and in seating relationship with the orifice plate by means of pins 30, the ends of which are conical so as to be received within and engage complementary socket portions provided in the slide valve.

The opposite ends of pins 30 are received within socket portions of spring struts 32 which are secured to orifice plate 20 by means of fastener members 34, all as more fully set forth in my co-pending patent application.

The operating characteristics of the slide valve are controlled by actuator rods 36 and 38, each of which is secured to and extends axially from coupling element 40. Pin 42 operatively interconnects the coupling element and the slide valve.

The valve housing is denoted generally by the numeral 44 and includes a portion 46 detachably secured thereto by means of bolts 48, thereby providing easy access to orifice plate 20, slide valve 28 and the interior of the mixing chamber C.

Actuator rod 36 extends upwardly out of the mixing chamber, through and beyond the upper end of housing 44 and the internally and externally threaded boss 50 formed integrally with housing 44. A suitable packing nut 52 may threadably engage the inner threaded portion of the boss for disposing a quantity of packing 54 around the actuator member for effecting a fluid-tight seal while permitting axial movement of actuator member 36 relative to the valve housing.

In the preferred embodiment of the invention a bonnet or adjuster housing 60 including a pair of laterally-spaced upper and lower elements 62 and 64 fixedly interconnected by side elements 66 is securely though releasably fastened to the valve housing. Each of elements 62 and 64 is provided with through, internally threaded apertures 68 and 70, respectively, the latter dimensioned to engage the externally threaded portion of boss 50.

A spring housing or carrier 72, including a pair of laterally spaced fixedly-interconnected upper and lower end members 74 and 76 is loosely receivable in the bonnet or adjuster housing between elements 62 and 64. Lower end member 76 is provided with a blind or closed ended recess 78 into which the upper end of actuator member 36 is receivable. If desired, the interior of end member 76 may be provided with raised central portion 80 dimensioned to extend into spring 82.

The interior walls of the spring carrier are dimensioned so as to admit spring 82 which is free to compress or decompress in an axial direction. Spring 82 is disposed between the bottom end of the spring carrier and spring guide or abutment 86 which engages the top end of the spring. The bottom portion of the spring guide or abutment may be undercut so as to receive the upper end of spring 82. The spring guide is, however, received wholly within the spring carrier and dimensioned so as to slide freely in an axial direction relative to the spring carrier, although it makes a close fit with the walls of the spring carrier and so will permit only linear motion of the spring.

The upper end member of the spring carrier 72 is closed by and comprises a disc 74 which is secured to the walls of the carrier in any suitable manner such as, by way of example, an interference fit between the walls and the disc plus peening over of the walls. An aperture 90 is provided through disc 74.

The top surface of spring guide 86 is recessed so as to complementarily and slidably receive sleeve 92 which is in turn securely fastened to the bottom end of adjusting rod or shaft 94 by any suitable means such as screw threads and pin 96 as clearly illustrated in Fig. 1. The free end of adjusting rod 94, together with sleeve 92, is received within spring carrier 72 through opening 90 in disc 74, the opening being dimensioned so as to allow free rotation of the actuator shaft 94.

In the preferred embodiment of the invention a sleeve 100 is provided with external threads dimensioned to engage internally threaded bore 68 through upper end element 62 of bonnet 60. A nut 102 engages the external threads of sleeve 100 for securely though releasably anchoring it relative to the bonnet. This sleeve is likewise provided with internal threads engageable by the threaded portion 104 of actuator shaft 94.

The free outer end of shaft 94 is provided with a handle 106, which may be turned to produce relative axial movement between shaft 94 and sleeve 100, and thus between shaft 94 and the housing 60.

The relation of the spring to the housing is determined by adjusting shaft 94. The shaft is set in a fixed position relative to the housing and bears on the top end of the spring by means of abutment 86. Compression of the spring causes a force to be exerted on the bottom of spring housing 72. This force is in turn transmitted to actuator member 36 and thence to slide valve 28, tending to yieldingly urge the valve linearly downward toward one end of its stroke.

The tension on the spring can be accurately governed by turning handle 106 and thus moving adjusting shaft 94 upward or downward relative to housing 60. The downward travel of the adjusting shaft may be limited by a suitable means, such as, by way of example, the limit of the screw threads 104 on the shaft or rod, the diameter of the shaft or rod above the threads being the outside diameter of the threads or greater. This limit will prevent over-compression of spring 82.

The upward travel of adjusting shaft 94 is limited by sleeve 92 which will interferingly engage the lower end of sleeve 100 if the adjusting shaft is moved sufficiently upward, preventing further movement of the shaft in that direction.

Some compression will always be present in spring 82. Spring guide or abutment 86 is greater in diameter than opening 90 in disc 74, therefore even if adjusting shaft be completely withdrawn upwardly out of the spring carrier, the spring guide or abutment 86 will interferingly engage disc 74 preventing further decompression of the spring and assuring that the spring does not escape from the spring carrier.

Actuator member 38 extends downwardly from coupling element 40 into discharge chamber D which is divided into an upper zone 120 and a lower zone 122 by flexible diaphragm 124 which spans the chamber. The outer peripheral edge of the diaphragm may be securely anchored within an annular seat provided between adjacent portions of housing 44 and a dome member 126. The lower zone is formed between diaphragm 104 and the dome, and is filled with a thermally responsive fluid or gas.

A pressure plate 128 having an enlarged flange 130 is secured to the upper face of the diaphragm in upper zone 120 by suitable means such as soldering. The lower end of actuator member 38 is fixedly secured to the pressure plate such as, by way of example, by means of complementary threaded portions, as illustrated.

A discharge or outlet port 132 is provided in open communication with zone 120 of the discharge chamber D, said port being preferably located remote from the central portion of valve housing 44.

In the preferred embodiment of the invention, the mixing chamber C and discharge chamber D are interconnected and in normal open communication whereby the entire flow of fluid into the mixing chamber is directed into the discharge chamber and particularly into upper zone 120 directly onto and against the upper face of the diaphragm, thence outwardly through port 132.

In this manner I have provided highly effective means within the valve housing per se which means are extremely sensitive to even the slightest temperature variation in the fluid flowing from the mixing chamber into the discharge chamber.

Figure 2:
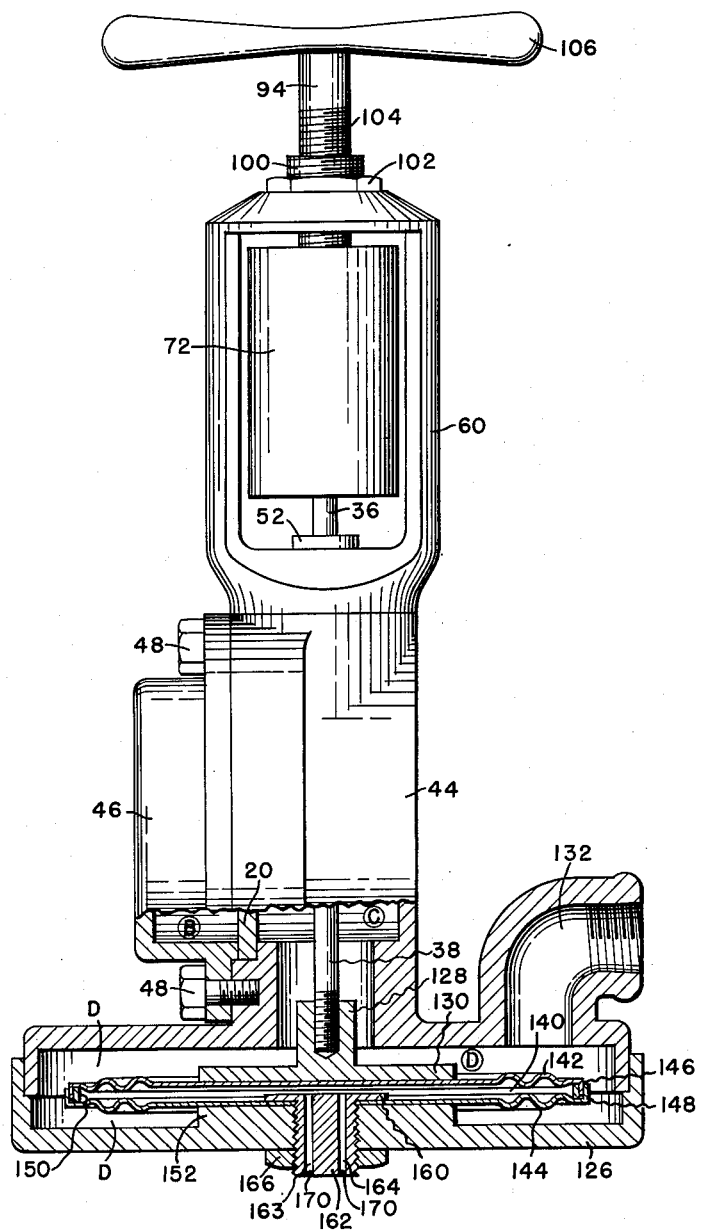
Fig. 2 is a side elevational view of a modified form of mixing valve embodying the teachings of the present invention, partly in section.

With reference now to Fig. 2, it will be noted that I have provided a different type of thermally responsive device which comprises a two-piece circular diaphragm 140 comprising an upper element 142 and a lower element 144 fixedly and permanently interconnected along their complementary outer peripheral edges 146 and 148, respectively, secured together, such as by means of solder, so as to present a gas and fluid tight seal. A spacing washer 150 may be utilized to hold the diaphragm elements apart, as illustrated.

Flange 130 of pressure plate 128 is fixedly secured to the outer face of the upper diaphragm element 142, whereas the inner face of dome 126 is provided with an elevated central boss 152 of an area approximating the area of flange 130. The lower diaphragm element 144 is fixedly secured to boss 152 such as, by way of example, by means of flange 160 of an externally threaded stud 162 provided with a pair of axial passageways 163 and 164 therethrough. The lower face of the flange may be soldered or brazed to the inner face of the lower diaphragm element. A nut 166 engages stud 162 for positively and securely anchoring the diaphragm assembly relative to boss 152.

The interior of the diaphragm is filled with a suitable thermal responsive gas or fluid via passageways 163 and 164 which are then sealed off as at 170.

The primary distinction between the device of Figs. 1 and 2 resides in the structural and operational characteristics of the thermal responsive means, the device of Fig. 2 being more sensitive than the device of Fig. 1 by reason of the diaphragm mounting which permits the fluid flowing through discharge chamber D to freely circulate on opposite sides of the diaphragm.

Outlet port 132 may be suitably connected to a shower head 91 by means of a length of pipe or tubing denoted generally by the numeral 93.

In operation of both valves a suitable source of hot fluid may, by way of example, be connected to inlet port 10 of chamber A and a suitable source of cold fluid connected to port 12 of chamber B. The hot and cold fluids from chambers A and B will be discharged through their respective orifice ports 22 and 24 into mixing chamber C in which they will be thoroughly mixed and then flow into discharge chamber D onto and against the thermal responsive means therein, whereby the fluid discharged through outlet port 132 will be of a temperature between the temperatures of the hot and cold fluids entering ports 10 and 12.

In either embodiment, the mixed fluid discharging from chamber C will circulate in chamber D causing the thermally responsive fluid or gas confined by the diaphragm to quickly reach a temperature substantially that of the mixed fluids. This temperature establishes a certain pressure which tends to move the diaphragm, thus pushing upward on the pressure plate 128, actuator rod 38, and slide valve 28, tending to move the slide valve linearly to the upper end of its stroke.

The force of the thermally responsive gas or fluid confined by the diaphragm is opposed by a counter-force or downward thrust of spring 82 acting through actuator rod 36 to urge the slide valve linearly downward toward the opposite end of its stroke. If the force exerted by the diaphragm is greater than that exerted by the spring, the slide valve will be shifted upward uncovering more of port 24 in orifice plate 20 while cutting off some of the exposed area of port 22. This will admit a greater proportion of cold to hot fluid passing into mixing chamber C and thence into the discharge chamber D. The resulting cooler mixture will immediately lower the temperature in chamber D causing the diaphragm elements to exert a lesser force upward. Spring 82 can then shift the valve slightly downward. The two forces will reach a balance point and the mixed fluid will be of a constant temperature.

Similarly, if spring 82 exerts a greater force downward than than the push upward by the diaphragm elements, the valve will shift downward permitting a greater ratio of hot to cold fluid to enter chamber C, increasing the temperature of the mixed fluids and causing gas or fluid confined by the diaphragms to expand and move valve 28 upward. Again a balance point will be quickly reached.

If the inlet source of hot or cold fluid varies, the diaphragm element and spring will co-operate in the above described manner to maintain a substantially constant discharge temperature of the mixed fluids. Thus a drop in the supply or temperature of hot fluid will allow the spring to shift the slide valve downward because of a decrease in the pressure of the gas or fluid confined by the diaphragms resulting from cooler discharge fluid. Downward movement of the slide valve increases the inlet of hot fluid and decreases the inlet of cold fluid to chamber C, thus bringing the mixed fluids quickly back to their original temperature. The valve works conversely to maintain constant discharge temperature if the cold fluid supply is lowered or its temperature raised.

By proper manipulation of handle 106 and thus of the tension on the spring, any desired temperature of the mixed fluids may be accurately preselected. Greater tension on the spring will result in higher temperature of the mixed fluids because it will tend to shift the valve downward, uncovering hot fluid port 22, and will require greater force by the diaphragm elements to overcome the spring force and shift the valve upward. Conversely lesser tension in the spring will mean lower temperature of the mixed fluids. By screwing adjusting rod to its fully raised position, a discharge flow of cold fluid only can be obtained. A dial and pointer, not illustrated, may be supplied with the adjusting rod to facilitate preselection of the discharge fluid temperature.

In the above manner I have provided a mixing valve extremely sensitive to temperature change yet easily contructed and quite durable.

Various changes and modifications in the structural details of this device may, of course, be made within the scope of the claims without departing from the spirit of the invention.

What is claimed is:

1. A fluid mixing valve comprising a housing having a pair of inlet chambers, a mixing chamber and a discharge chamber, means within said mixing chamber for proportioning the flow of fluid from each of said inlet chambers into the mixing chamber, said means including a substantially flat slide valve and an actuator member therefor one end of which member extends outwardly through said housing, the other end of which extends into and terminates in said discharge chamber, thermal responsive means disposed in, secured to and carried by said discharge chamber, said means operatively engaging an end of said actuator member, said mixing and discharge chambers being interconnected whereby the entire flow of fluid into the mixing chamber is directed into the discharge chamber and directly onto and against the thermal responsive means therein, a second housing including a pair of laterally spaced fixedly interconnected upper and lower elements, a spring housing including a pair of laterally spaced fixedly interconnected upper and lower end members, said upper end member having an aperture therethrough, a spring abutment disposed between said end members for axial movement within said housing, a spring interposed between said abutment and the lower end member for normally and yieldably urging it toward the upper end member, said lower end member having a recess therein dimensioned to receive that end of the actuator member which projects outwardly from the valve housing, the upper element of the second housing having a threaded bore therethrough in substantial axial alignment with said spring housing, a shaft threadably engaging said bore for disposing one end thereof through the aperture in the upper end of the spring housing and in contacting relationship with said spring abutment, said shaft rotatable for applying a resilient counterforce to that end of the actuator member remote from said thermal responsive means, and means interconnecting said first and second housings.

2. A fluid mixing valve comprising a housing including a mixing chamber and a discharge chamber, a pair of inlet chambers disposed on one side of the mixing chamber, substantially flat slide valve means within said mixing chamber for proportioning the flow of fluid from each of said inlet chambers into the mixing chamber, said means including an actuator member one end of which extends outwardly through and projects beyond said housing, the other end of which extends into said discharge chamber, a flexible diaphragm spanning the discharge chamber for dividing it into an upper and a lower zone with that side of the diaphragm in the upper zone secured to an end of said actuator member, said mixing and discharge chambers interconnected whereby the entire flow of fluid into the mixing chamber is directed into the upper zone of the discharge chamber and directly onto and against the said diaphragm, a thermal responsive media contained within said lower zone, a bonnet including a pair of laterally-spaced fixedly-interconnected upper and lower elements, a spring housing loosely receivable between said upper and lower elements, said housing including a pair of laterally - spaced fixedly - interconnected upper and lower end members, said upper end member having an aperture therethrough, a spring abutment disposed between said end members for axial movement within said spring housing, a spring interposed between the lower end member and said abutment for normally and yieldably urging it toward the upper end member, said lower end member having a closed ended recess therein dimensioned to receive that end of the actuator member which projects outwardly beyond the valve housing, the upper and lower elements of the bonnet having axially aligned and threaded bores therethrough, a shaft threadably engaging the bore through the upper element for disposing the free end of said shaft through the aperture in the upper end of the spring housing and in contacting relationship with said spring abutment, said shaft rotatable for indirectly applying a resilient counterforce through said spring, spring housing and thence to that end of the actuator member remote from said diaphragm, and an externally threaded boss projecting from the valve housing and surrounding portions of the actuator member which projects outwardly of and beyond said boss, the threaded bore of the lower element of said bonnet engageable with the boss of the valve housing for securely though detachably securing the bonnet in operative relationship with said actuator member.

3. A fluid mixing valve comprising a housing having a pair of inlet chambers, a mixing chamber and a discharge chamber, substantially flat slide valve means within said mixing chamber for proportioning the flow of fluid from each of said inlet chambers into the mixing chamber, valve actuating means including a pair of axially aligned actuator members one of which extends outwardly through said housing, the other of which extends into said discharge chamber, thermal responsive means disposed in, secured to and carried by said discharge chamber, said means operatively engaging an end of said actuator member, said mixing and discharge chambers being in open communication whereby the entire flow of fluid from the mixing chamber is directed into the discharge chamber and directly onto and against the thermal responsive means therein, a second housing including a pair of laterally spaced fixedly interconnected upper and lower elements, a spring housing including a pair of laterally spaced fixedly interconnected upper and lower end members, said upper end member having an aperture therethrough, a spring abutment disposed between said end members for axial movement within said housing, a spring interposed between said abutment and the lower end member for normally and yieldably urging it toward the upper end member, said lower end member having a recess therein dimensioned to loosely receive in abutting relationship that end of the actuator member which projects outwardly from the valve housing, the upper element of the second housing having a threaded bore therethrough in substantial axial alignment with said actuator members, a shaft threadably engaging said bore for disposing one end thereof through the aperture in the upper end of the spring housing and in contacting relationship with said spring abutment, said shaft rotatable for indirectly applying a resilient counterforce through said spring, to the spring housing and thence to that end of the actuator member engaging the spring housing, said counterforce being opposed to the force exerted by said thermal responsive means, said shaft also rotatable for completely removing the application of any resilient counterforce in opposition to the forces exerted by said thermal responsive means for shifting said slide valve means to completely close off the flow of fluid from one of said inlet chambers to said mixing chamber.

4. A fluid mixing valve comprising a housing having a pair of inlet chambers, a mixing chamber and a discharge chamber, means within said mixing chamber for proportioning the flow of fluid from each of said inlet chambers into the mixing chamber, said means including a substantially flat slide valve and an actuator member therefor one end of which member extends outwardly through said housing, the other end of which extends into and terminates in said discharge chamber, a pair of laterally spaced diaphragm elements interconnected along their peripheral edge for defining a closed receptacle for a thermally expansible media housed therein, a pressure plate secured to and carried by that end of the actuator member terminating in the discharge chamber, said plate engaging the central portion of one of said diaphragm elements, a raised boss provided in the discharge chamber, means securing the other diaphragm element to said boss for mounting the diaphragm centrally of the discharge chamber for free circulation of fluid therearound, said mixing and discharge chambers being interconnected whereby the entire flow of fluid from the mixing chamber is directed into the discharge chamber directly onto and around the receptacle defined by the diaphragm elements, and axially shiftable means located exteriorly of the valve housing engaging that end of the actuator member which extends through said housing for applying a resilient force to said member.

5. A mixing valve comprising a housing divided into a pair of inlet chambers, a mixing chamber and a discharge chamber, an inlet port in both the inlet chambers, a substantially flat orifice plate between the mixing and each of the inlet chambers, said plate provided with two ports interconnecting the mixing and each of the inlet chambers, a flat slide valve located in the mixing chamber dimensioned to selectively engage the ports in said orifice plate for proportionately varying their relative openings, means yieldably urging said valve in seating relationship with said orifice plate, an opening in said housing interconnecting said inlet chamber and said discharge chamber, a hollow expansible diaphragm element all sides of which are in open communication with said discharge chamber secured to and carried by said housing on a portion of one side, an actuator rod interconnecting the opposite side of said element and said valve, means within said element operable in response to temperature changes for expanding said element for linearly shifting said valve in one direction toward one end of its stroke, a second actuator rod one end of which engages said valve, a spring engaging the other end of said second actuator rod for urging said valve in the opposite direction toward the other end of its stroke, means adjustably secured to said housing for engaging and carrying said spring and operable for selectively controlling the effectiveness of said spring means on said valve.

6. A mixing valve comprising a housing comprising two inlet chambers, a mixing chamber and a discharge chamber, an inlet port in each inlet chamber, an orifice plate disposed between the mixing chamber and both inlet chambers, said plate provided with two ports, one interconnecting each inlet chamber and said mixing chamber, a flat slide valve located in the mixing chamber dimensioned to selectively engage the ports in said orifice plate for proportionately varying their relative openings, said mixing and discharge chambers being in open communication, a movable diaphragm element within said discharge chamber secured to said housing along its peripheral edge for dividing said chamber into an upper zone and a lower zone, an actuator member interconnecting said diaphragm element and said valve, thermally responsive media in said lower zone operable in response to temperature changes for shifting the diaphragm element for moving said valve toward one end of its stroke, a second actuator member one end of which engages said valve, and means engaging the other end of the second actuator member for normally and yieldably urging said valve toward the other end of its stroke.

WILLIAM V. JORDAN.

REFERENCES CITED

The following references are of record in the file of this patent:

UNITED STATES PATENTS

| Number | Name | Date |
| --- | --- | --- |
| 1,208,130 | Fulton | Dec. 12, 1916 |
| 1,900,221 | Beardsley | Mar. 7, 1933 |
| 1,980,624 | Kenney | Nov. 13, 1934 |
| 2,465,458 | Jordan | Mar. 29, 1949 |